(12) United States Patent
Brinkley et al.

(10) Patent No.: US 8,919,627 B2
(45) Date of Patent: Dec. 30, 2014

(54) CURVED LOAD SUPPORT FOR USE ON A VEHICLE

(71) Applicants: Eddie Clifton Brinkley, Lexington, NC (US); Chadwick Clifton Brinkley, Thomasville, NC (US)

(72) Inventors: Eddie Clifton Brinkley, Lexington, NC (US); Chadwick Clifton Brinkley, Thomasville, NC (US)

( * ) Notice: Subject to any disclaimer, the term of this patent is extended or adjusted under 35 U.S.C. 154(b) by 0 days.

(21) Appl. No.: 13/919,075

(22) Filed: Jun. 17, 2013

(65) Prior Publication Data

US 2013/0284781 A1   Oct. 31, 2013

(51) Int. Cl.
| | | |
|---|---|---|
| *B60R 9/00* | (2006.01) | |
| *B60R 11/00* | (2006.01) | |
| *B60R 9/06* | (2006.01) | |
| *B60P 3/10* | (2006.01) | |
| *B60R 9/08* | (2006.01) | |

(52) U.S. Cl.
CPC ... *B60R 9/06* (2013.01); *B60P 3/10* (2013.01); *B60R 9/08* (2013.01)
USPC .......................................... 224/519; 224/521

(58) Field of Classification Search
USPC ............... 224/554, 519, 521; 296/3, 26.08
See application file for complete search history.

(56) References Cited

U.S. PATENT DOCUMENTS

| | | | | |
|---|---|---|---|---|
| 5,120,102 | A | * | 6/1992 | Cumbie .............................. 296/3 |
| 5,451,088 | A | * | 9/1995 | Broad .......................... 296/26.08 |
| 5,458,389 | A | * | 10/1995 | Young .......................... 296/26.08 |
| 5,615,813 | A | * | 4/1997 | Ouellette ....................... 224/405 |
| 5,649,656 | A | * | 7/1997 | Davy .............................. 224/405 |
| 5,678,743 | A | * | 10/1997 | Johnson et al. ................ 224/485 |
| 5,752,636 | A | * | 5/1998 | Manley .......................... 224/405 |
| 5,938,092 | A | * | 8/1999 | Johnson ......................... 224/521 |
| 5,950,890 | A | * | 9/1999 | Darby ............................ 224/402 |
| 6,050,627 | A | * | 4/2000 | Lee ............................... 296/26.09 |
| 6,070,926 | A | * | 6/2000 | Hardin ......................... 296/26.08 |
| 6,113,171 | A | * | 9/2000 | Stearns ........................ 296/26.08 |
| 6,237,824 | B1 | * | 5/2001 | Bagley .......................... 224/521 |
| 7,243,966 | B1 | * | 7/2007 | Sheldon ....................... 296/26.08 |
| 8,028,874 | B2 | * | 10/2011 | Stiles ............................ 224/310 |
| 8,251,265 | B2 | * | 8/2012 | Grudek ...................... 224/42.12 |
| 2004/0105960 | A1 | * | 6/2004 | Kennedy ....................... 428/188 |
| 2011/0024472 | A1 | * | 2/2011 | Thompson et al. ........... 224/500 |

* cited by examiner

*Primary Examiner* — Justin Larson
*Assistant Examiner* — Lester L Vanterpool

(57) ABSTRACT

A load carrier or extender arm suitable for use on pick-up trucks or other vehicles includes telescoping curved bars that allow adjustment of the height of a load support cross arm or other support surface relative to a vehicle hitch receiver in which the device is mounted. The curvature of the two members increases the elevation of the device to avoid bottoming out. The rear curved member is part of a T-shaped load support with a cross arm extending laterally of the curved member. The extender arm is especially suited for transporting boats, canoes and kayaks in a pick-up truck.

5 Claims, 5 Drawing Sheets

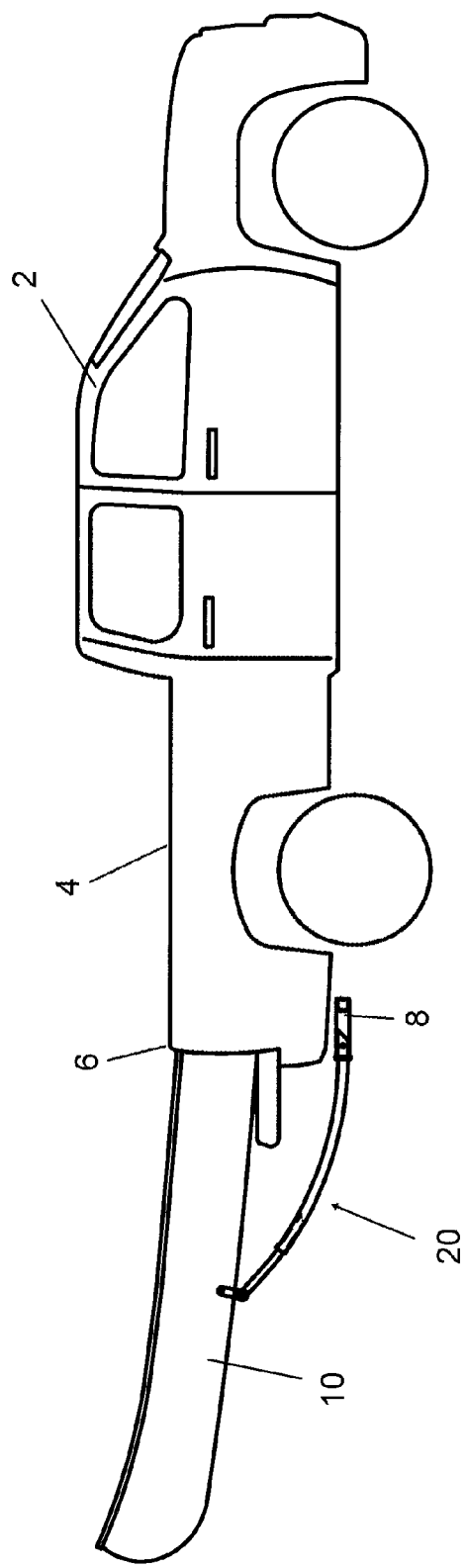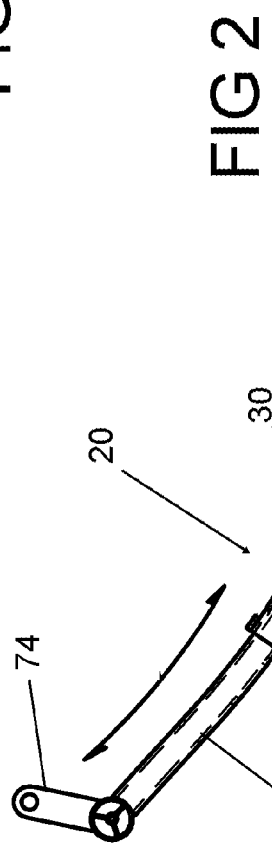

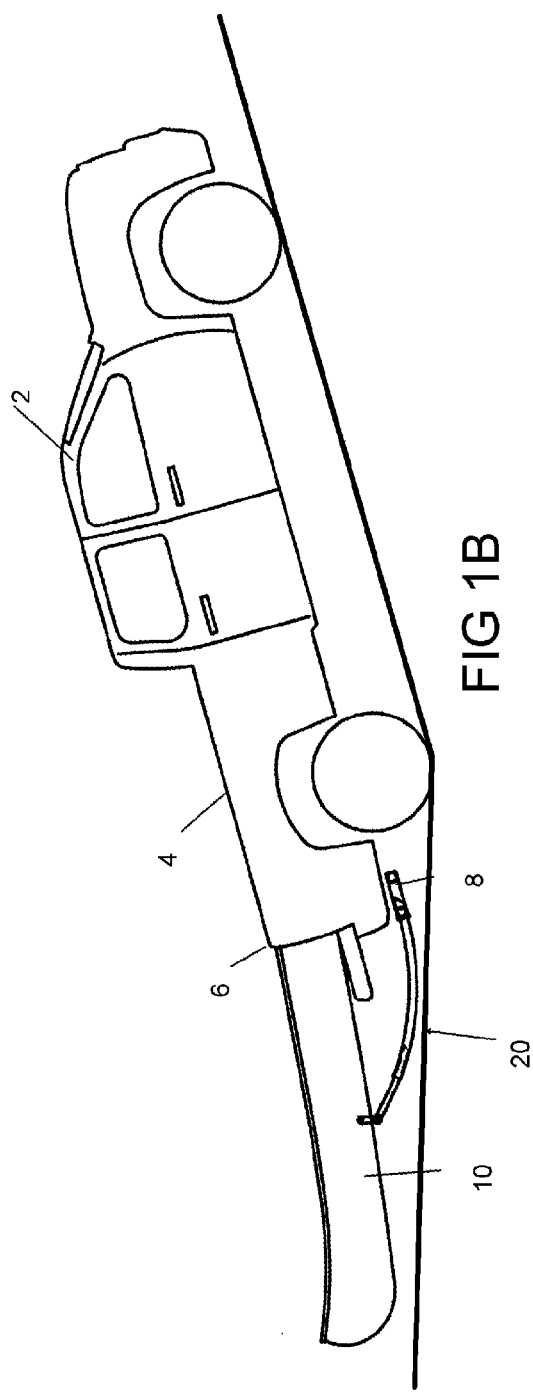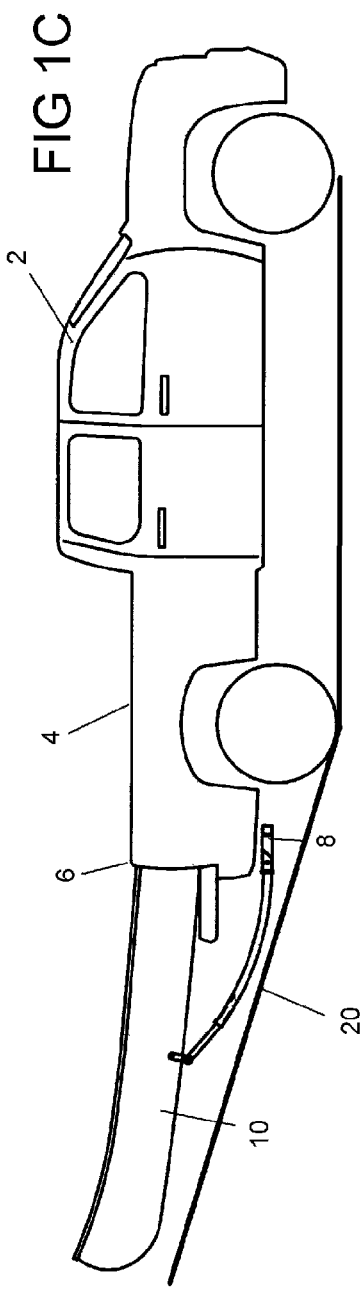

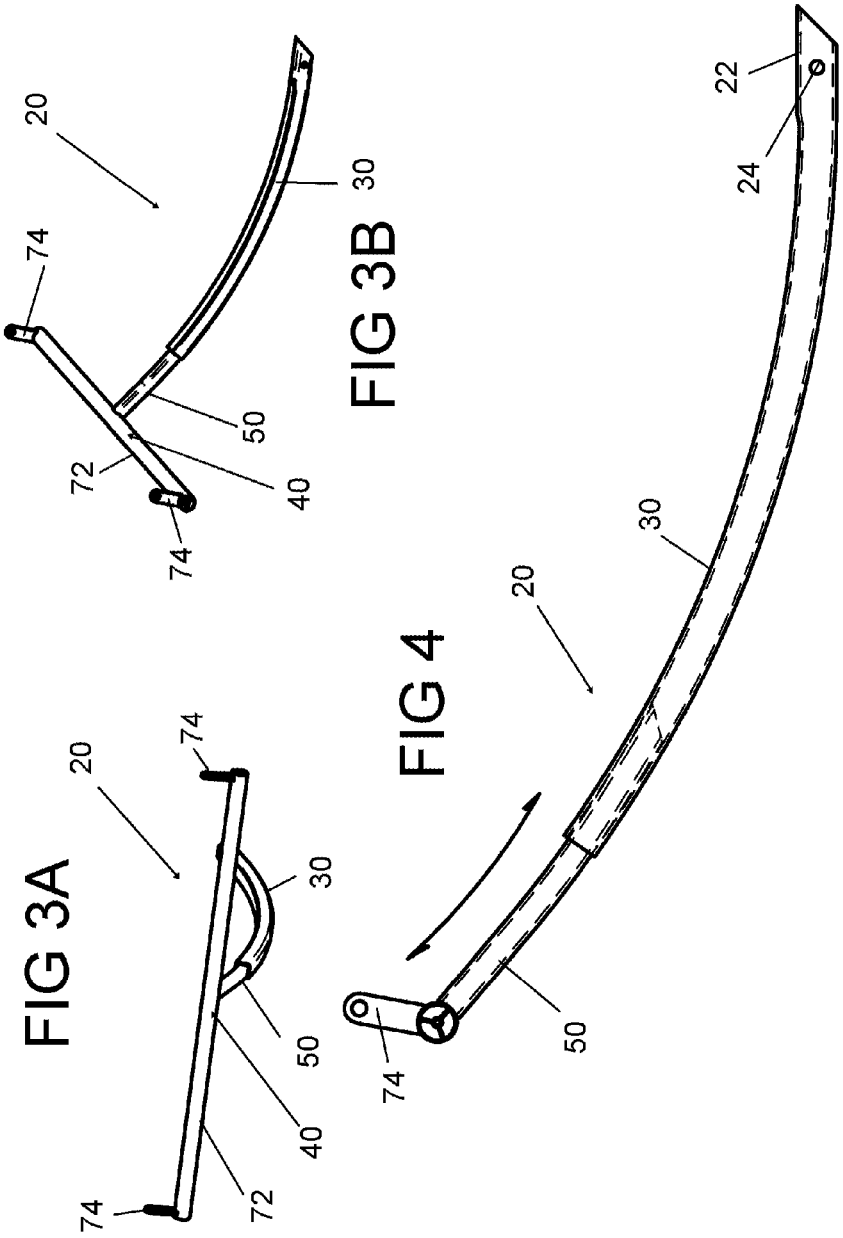

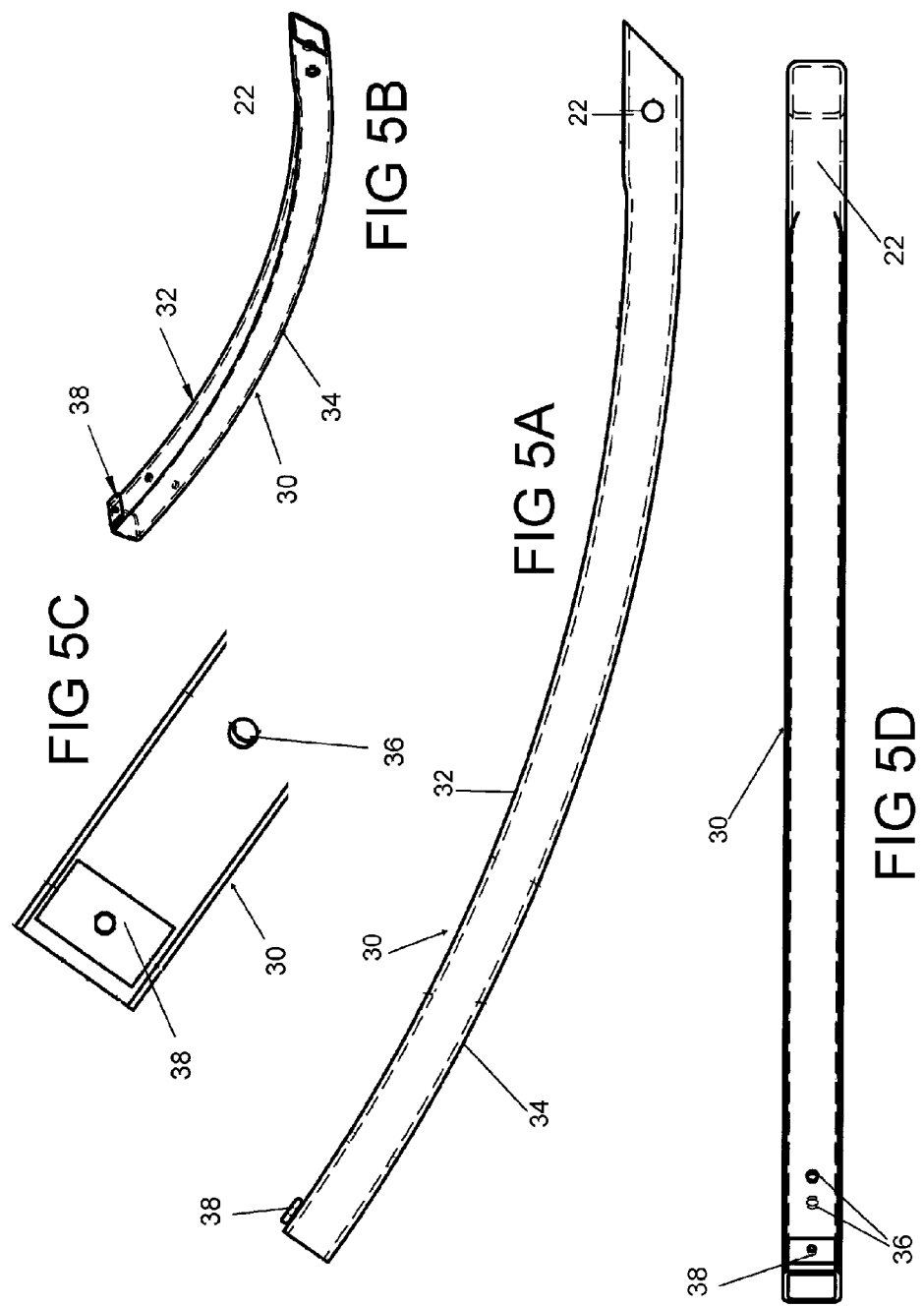

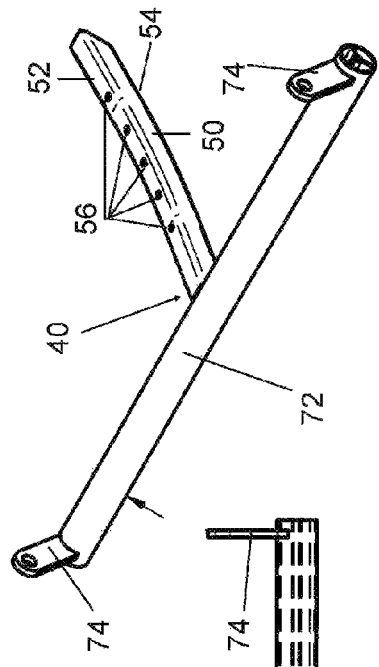
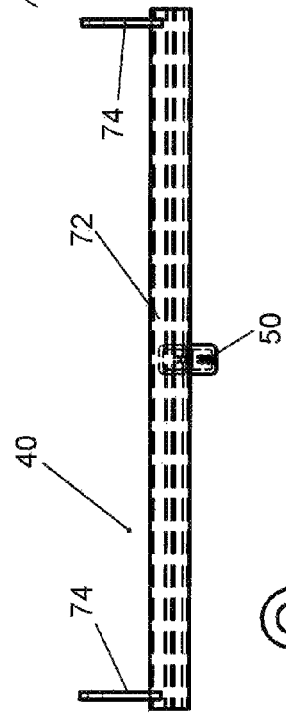
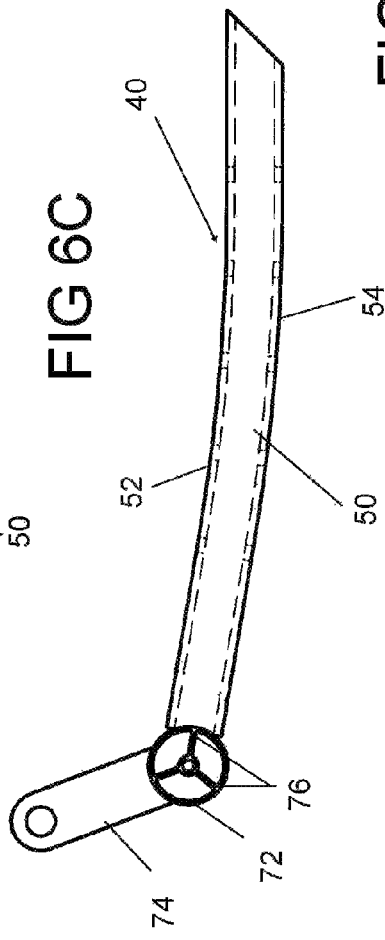
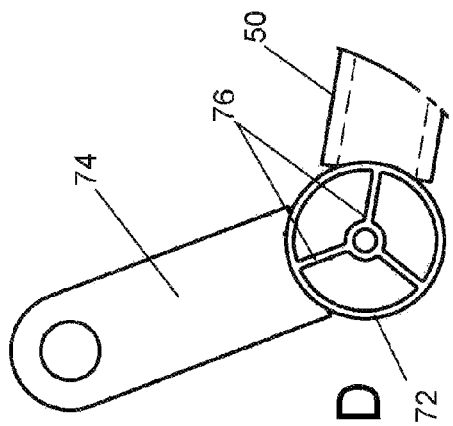

CURVED LOAD SUPPORT FOR USE ON A VEHICLE

CROSS REFERENCE TO PRIOR CO-PENDING APPLICATION

This application claims the benefit of the filing date of prior co-pending U.S. Provisional Patent Application 61/813,620 filed on Apr. 18, 2013.

BACKGROUND OF THE INVENTION

1. Field of the Invention

This invention is related to a load carrier or extender that is attachable to a vehicle and to a standard hitch receiver on the vehicle. This invention also relates to a load carrier or extender that is adjustable so that the location of the load support can be altered relative to the rear of the vehicle or to the hitch receiver.

2. Description of the Prior Art

U.S. Pat. No. 5,938,092 discloses a drawbar load support or carrier that can extend from a hitch receiver at the rear of a vehicle, such as a pick-up truck. Although referred to as a continuously curved drawbar, this prior art drawbar has a first straight section that appears to extend rearwardly from the hitch receiver to beyond a tail gate. At that point, the straight section joins a curved section that rises above the hitch receiver. An adjustable T-bar is then mounted to an adapter at the rear of the curves section so that the elevation of the load, supported by the drawbar can be varied. The partial curvature of the drawbar is intended to reduce the amount of high load impact that is transferred to the hitch receiver. Although the partial curvature of this drawbar may in some circumstances provide some additional ground clearance, that clearance is either limited or the height adjustment range of the prior art adjustable T-bar is limited. If the T-bar is too long, the drawbar may bottom if the lower vertical portion of the T-bar extends below the elevation of the straight section or the hitch receiver. Any ground clearance of reduction in the deflection of this prior art drawbar is thus significantly reduce if the vertical arm of the adjustable T-bar strikes the ground as the vehicle traverse an inclination or elevation change. The T-bar adapter subassembly also adds components to the drawbar assembly.

SUMMARY OF THE INVENTION

Unlike the prior art, the extender arm of the present invention is curved from the hitch receiver connection at the front of the extender arm to the load support subassembly at the rear. This provides additional ground clearance relative to the prior art, under all load conditions. Adjustment of this T-bar load support subassembly is provided by two telescoping curved extender bars in the form on tubes, one insertable into the other. This simplifies the structure of the extender bar by eliminating adapters, weight and fabrication steps believed to be required by the prior art. The instant invention is also suitable for use with different vehicles in which the elevation of the load support bed or surface relative to the location of the standard hitch receiver my vary. This elevation is not standard for all vehicles, and for that matter on all pick-up trucks. One extender arm can thus be used on different vehicles, without the need for any dimensional changes, other than telescoping adjustment of the two primary components of the device represented by the embodiment depicted herein.

According to one aspect of this invention, the extender arm supports a load extending beyond a vehicle. The extender arm has a hitch connection section mountable to a hitch receiver on the vehicle. A first curved extender bar section extends upwardly from the hitch connection section and extending upwardly from a rear end of a vehicle when the extender arm is mounted in the hitch receiver on the vehicle. A second curved extender bar section telescopes relative to the first curved extender bar section. A load support member, preferably including a cross arm is mounted on the second curved extender bar section. The second curved extender bar section can be shifted relative to the first extender bar section to alter the length of the extender arm and to shift the load support member vertically so that the extender arm will support loads at different elevations relative to the hitch connection section and the hitch receiver to which the hitch connection section is mounted.

According to another aspect of this invention, the extender arm includes an extender tube attachable to a hitch receiver on the vehicle. This extender tube is continuously curved for the majority of its length. A T-shaped support member has a curved bar to which a cross bar is fixed. The curved bar is mounted on the continuously curved extender tube and telescoping relative thereto between multiple positions, so that the length and height differential between opposite ends of the extender arm can be varied, so that the extender arm can be with different vehicles in which the elevation between the load and the hitch receiver differs.

This invention also is directed to an apparatus for transporting a boat in a pick-up truck having a bed and a hitch receiver mounted on the rear of the pick-up truck. A second extender bar extends from a first extender bar and telescoping relative thereto. Both the first extender bar and the second extender bar are curved along a constant radius of curvature in a section in which the first and second extender bars relatively telescope. A cross bar is fixed to the second extender bar so that as the second extender bar telescopes relative to the first extender bar. The elevation of the cross bar relative to the hitch receiver changes to level the boat relative to the pick-up truck bed and to support a portion of the boat extending beyond the pick-up truck bed.

According to another aspect of this invention, one component of the extender arm is an extender tube attachable at a first end to a hitch receiver on the vehicle. The extender tube has a rectangular cross section with curved corners and is continuously curved for the majority of its length. A cross member is attached to a second end of the curved extender tube with the cross member being intersected by the curved extender member to form a T-shaped configuration. The cross member extends laterally beyond the extender tube on both ends thereof, wherein the cross member has a circular cross section.

BRIEF DESCRIPTION OF THE DRAWINGS

FIG. 1A is a view showing the extender arm of this invention supporting a boat that extends beyond the bed of a pick-up truck. FIGS. 1B and 1C are views showing the clearance provided when a truck with a load, such as a boat, canoe or kayak passes from one ground surface which extends at an angle relative to another.

FIG. 2 is a fragmentary view of the extender arm showing how the curve arm sections are telescoped.

FIGS. 3A and 3B are three dimensional views of the telescoping extender arm viewed from different orientations.

FIG. 4 is a side view of the entire extender arm showing the manner in which the second arm sections telescopes relative to the first extender arm section.

FIGS. 5A-5D are views showing the curved inner extender bar member that is attachable to a vehicle hitch receiver. FIG. 5A is a side view of the inner extender bar member and FIG. 5B is a three dimensional view. FIG. 5C is a fragmentary view of the trailing edge of this member, and FIG. 5D is a top view of this inner extender bar member.

FIG. 6A-6D are views of the T-shaped curved outer extender bar section that telescopes relative to the curved inner extender bar member shown in FIGS. 5A-5D. FIG. 6A is a three dimensional view and FIG. 6B is a rear view. FIG. 6C is a side view and FIG. 6D is a detailed view showing the transverse load support bar.

DETAILED DESCRIPTION OF THE PREFERRED EMBODIMENT

The representative embodiment of the load extender arm 20 of this invention is especially suited for use in transporting a boat, kayak or canoe 10 in a pick-up truck 2 as shown in FIG. 1. The extender arm 20 can be attached to a hitch receiver as shown in FIG. 1, and the arm 20 will extend beyond the rear end 6 of the truck. The curved extender arm 20 not only extends rearwardly, but also extends upwardly. The curved extender arm 20 includes two extender bar sections 30 and 50 which telescope relative to each other, so that they will support a load, such as the canoe 10, which extends beyond the truck or vehicle 2. Since the vertical as well as the horizontal reach of the curved extender arm 20 can be varied, the canoe 10 or other load can be supported on the same level as the truck or vehicle bed 4. It should be understood however, that the extender arm 20 is also suited for supporting various loads that would extend beyond the rear of a vehicle, and is not limited to use in transporting sporting equipment. This invention can also be employed with other items, such as lumber or construction equipment.

An important aspect of extender arm 20 is that the same arm assembly can be used on different vehicles or trucks. The extender arm 20 can be mounted on a standard hitch receiver 8 that would be located beneath a vehicle, such as at the rear end 6 of pick-up truck 2. The height of the bed 4 of different vehicles is not located at the same differential elevation with respect to the height of the standard hitch receiver 8. Extender arm 20 therefor has two main components, the first curved extender bar section 30 and the T-shaped support member 40 that includes a second curved extender bar section 50. In use, the first extender bar section 30 is mounted the hitch receiver 8, and the second curved extender bar section 50 telescopes relative to the first curved extender bar section 30 as shown in FIGS. 2 and 4. The radius of curvature of the two curved sections 30 and 50 is the substantially the same and the curvature is relative to the same center of curvature to allow this telescoping motion. This telescoping motion alters both the horizontal length and the vertical height differential between a forward end and a rear end of the extender arm 20. Thus the extender arm 20 can be positioned to accommodate loads, such as boats or kayaks 10 that are of different lengths. Telescoping the extender arm 20 also allows one to keep the boat or kayak or other load 10 level relative to the bottom of the truck bed 4. The curvature of both extender bar sections 30 also allows a relatively large clearance between the extender arm 20 and the ground, since the lowest elevation of the extender arm 20 is the elevation of the hitch receiver 8, and that occurs at the rear end 6 of the vehicle. This will provide clearance even when a vehicle is backing up into the side of a hill, or across an obstacle. The curvature of this extender arm 20 also increases the weight that can be carried by an arm of a given size and weight, since the curvature increases the bending moment that can be withstood.

FIGS. 3A and 3B show the extender arm 20 and the T-shaped support member 40, on which a load, such as canoe, boat, or kayak 10 will rest. A cross arm 72, which will comprise a load support member engaging the load, extends transversely relative to the second extender bar section 50 and to the first extender bar section 30. The cross arm 72 is intersected by the extender arm 20, and the centerline of the cross arm 72 is coincident with the generally curved centerline of the two curved bar sections 30 and 50. In the preferred embodiment, this cross arm 72 extends perpendicular to the extender bar sections and equidistant on both sides thereof. Attachment ears 74 are located adjacent opposite ends of cross arm 72.

The front or first extender bar section 30 is shown in more detail in FIGS. 5A-5D. In the preferred embodiment, this curved extender bar section 30 is formed by continuously bending an initially straight rolled aluminum tube having a generally two inch by two inch cross square cross section that is approximately 0.188 inch thick. The corners are radiused. The radius of curvature of the outer convex surface 34 would be 65.378 inches. These dimensions are for the initial embodiment of this invention and are merely representative. The material and the dimensions could be varied within a range that would be apparent to one of ordinary skill in the art. The material and dimensions could also be altered if the device were to be used for much larger loads than the types of long loads that might be carried in a standard pick-up truck.

As best seen in FIG. 5A, the curved portion of extender bar 50 has a slightly smaller than the relatively straight hitch connection section 22 at the front end. This reduced dimensions results when the initially straight tube, having the dimensions of the hitch connection section 22, are bent about a constant radius of curvature. The straight hitch connection section 22 will fit within a standard hitch receiver 8 of the type commonly used on pick-up trucks and other vehicles. The length of hitch connection section 22 is at least equal to the operative length of the standard hitch receiver 8 into which it is to be inserted. Preferably the length of hitch connection section 22 is limited so that it merely fills the hitch receiver 8 and the curvature of the first extender bar section 30 will begin at or quite close to the exit of the hitch receiver 8 and at the rear end 6 of the vehicle. A larger extension of the straight hitch connection section 22 will detract from the ground clearance allowed by the curvature of the curved extender arm 20. In the preferred embodiment depicted herein the length of the hitch connection section 22 will be 5.250 inches, although other dimensions could be employed. When the hitch connection section 22 is inserted into a standard hitch receiver 8, a mounting hole 24, extending though both sides will be positioned in alignment with a corresponding hole on the hitch receiver 8 and a pin can be inserted to secure the extender arm 20 to the hitch receiver 8 and to the vehicle 2. The angled portion of the tube at the front is not functional but is helpful in securing the tube in a conventional bending apparatus for fabrication. The overall length of the preferred embodiment of the front curved extender bar section 30 is forty-three inches and the elevation change between opposite ends of the curved bar section 30 is twelve inches, plus a fraction of the height of the tube. Of course these dimensions are only representative, but these representative dimensions are relevant to, but not equal to, the range of length and elevation changes that the extender arm 20 can accommodate.

When mounted on the vehicle 2, the convex surface 34 of the extender bar section 20 will face downward, and the opposite concave surface 32 will face upward. A hole 36 is located adjacent the rear end of the extender bar section 20. This hole or aligned holes 36 extend though both the concave upper surface 32 and the convex lower surface 34. In the top view of FIG. 5D, the hole 36 in the concave upper surface 32 is shown and the hole or aligned hole 36 extending through the lower convex surface 34 is hidden and shown as a hidden line. The axis of hole 36 or the aligned holes 36 will extend through the center of curvature of the curved section so that a mounting pin can be inserted through holes 36 and also through the second or rear extender bar section 50, which will be inserted into the rear end of the first or front extender bar section 30. A tab 38 is located at the rear end of the concave inner surface. This tab 38 also has a hole into which a binding bolt extends and is cinched down to prevent vibration. If the tab were eliminated, then the binding bolt would need to engage threads formed in the arm, and these treads might be more easily stripped.

The T-shaped support member 40 is shown in greater detail in FIGS. 6A-6D. T-shaped support member 40 includes a second curved extender bar section 50 which is attached to a load support cross arm 72. It should be understood that the term T-shaped is understood to be descriptive of the support member 40 even though the one of the members forming the T-shape is curved. Preferable the second curved extender bar section 50 is welded to the load support cross arm 72, although other attachment means could be employed. In the embodiment of this invention depicted herein the cross arm 72 is rigidly secured or attached to the rear end of the second curved extender bar section 50 by welding the two members together.

The second curved extender bar section 50 is formed in substantially the same manner as the first curved extender bar section 30, and it is curved about the same relative center of curvature. The second curved extender bar section 50 does not, however, have a straight section, such as hitch connection section 22. The width and height of the second extender bar section 50 will be less than the width and height of the tube forming the first extender bar section 30, so that the second curved extender bar section 50 can be inserted into the first extender bar section 30, and will telescope relative thereto to change the length and height differential of the extender arm 20. A series of preferably equally spaced holes 56 extend through at least the concave upper surface 52, as shown in FIG. 6A. Corresponding aligned holes can extend through the lower convex surface 54. Individual holes 56 can be aligned with hole or holes 36 in the first extender bar section 30 so that the T-shaped support member 40 can be shifted between multiple positions as the second curved extender bar section 50 is telescoped within the first curved extender bar section 30. A pin, not shown, will be inserted through aligned holes 36, 56 to secure the bard 30 and 50 in a position so that the desired length and height of the extender arm 20 relative to the hitch receiver 8 and the vehicle bed 4 or the load 10 can be established.

The load support cross arm 72 comprises a tubular cylinder having circular outer surface and a generally circular cross section. This circular surface will provide a surface that will facilitate loading a boat or other member, for example lumber, onto a vehicle 2. In the preferred embodiment depicted herein, this tube comprises an extruded aluminum tube that has three internal strengthening ribs 76 radiating from a central cylindrical hub. This provides additional rigidity to the cross arm 62, but it is not essential that the cross section conform to this preferred configuration, best seen in FIG. 6D. A simple cylindrical tube would also be functional.

Attachment or attachment ears 74 are secured adjacent opposite ends of the cross arm 72. These attachment ears 74 extend upwardly relative to the cross arm 73, when the extender arm is in use. Preferably, these attachment ears 74 are permanently bonded to the cross arm 72, for example by welding. Although the ears 74 may be rigidly bonded to the cross arm 72, they will rotate relative to the vertical and to the first curved extender bar section 30 as the second curved extender bar section 50 is telescoped inward and outward. These attachment ears 74 can include holes, so that a binding member, such as a rope can be secured to opposite attachment ears 74 to secure the load in place. The ears 74 also extend upwardly by a sufficient distance to abut the load 10 if there was a tendency for it to slide from side to side.

By employing curved telescoping members 30 and 50 to adjust both the length and height of the extender arm 20, this device avoids one significant problem encountered by prior art devices and commercial extender arms, support bars or drawbars. Nothing extends below the lower convex, curved surface 34 of tubular member 30. The extender arm 20 can be adjusted without the need of a bracket or shiftable vertical arm that is required in prior art devices, such as that shown in U.S. Pat. No. 5,938,092. In prior art and commercial devices, these shiftable vertical arms extend below the primary drawbar member and reduce ground clearance. Furthermore this reduction in ground clearance occurs at the rearmost end of the prior art drawbar member. If the end of the drawbar, and particularly the lower end of a vertical arm extending below the primary drawbar member strikes the ground, the relatively long moment arm will create a maximum stress in the front portion of the drawbar at the point where it is inserted into the hitch receiver in the vehicle. Repeated impacts at the end of the drawbar with the ground, as the vehicle traverses or encounters changes in the slope or inclination of ground surfaces, for example upon entering or exiting parking lots, will damage the drawbar where it enters the hitch. Internal stresses or rusting can occur, especially if a protective coating is compromised, and the life of commercial devices of this type have been reduced. The curvature of the lowermost extent of the extender arm 20 of the instant invention will therefore allow a larger departure angle or angle of descent to be traversed without striking the ground. This enhanced ability of the extender arm 20 to traverse large departure angles or slope changes is shown in FIGS. 1B and 1C. If the boat or load extends significantly beyond the rear end of extender arm 20, which would be the case in many situations, the rear of the load, instead of the rear of the extender arm 20 would actually strike the ground first.

The representative embodiment depicted herein is not the only version of this invention that could be adapted to a vehicle. For example, a larger version, having the same basic characteristics could be employed for use with larger trucks carrying larger loads. A smaller version might be more suitable for an off the road vehicle.

The preferred embodiment disclosed herein is representative of the invention, and other versions, which do not depart from the scope of this invention would be apparent to those of ordinary skill in the art. This invention is therefore not defined by the embodiment depicted herein, but are instead defined by the following claims.

We claim:

1. An extender arm for supporting a load extending beyond a vehicle, the extender arm comprising:
   a hitch connection section mountable to a hitch receiver on the vehicle;
   a first curved extender bar section extending upwardly from the hitch connection section and extending upwardly from a rear end of a vehicle when the extender arm is mounted in the hitch receiver on the vehicle;

a second curved extender bar section attachable to the first curved extender bar section and telescoping relative thereto; and a load support member mounted on the second curved extender bar section;

the second curved extender bar section being shiftable relative to the first curved extender bar section to alter the length of the extender arm and to shift the load support member vertically so that the extender arm will support loads at different elevations relative to the hitch connection section and the hitch receiver to which the hitch connection section is mounted wherein the load support member comprises a bar extending transversely from the second curved extender bar section and wherein the bar extends laterally beyond the second curved extender bar section on both sides thereof to form a cross bar and wherein attachment ears extend upwardly from opposite ends of the cross bar and wherein the attachment ears are fixed relative to the cross bar, but rotate relative to the first curved extender bar section as the second curved extender bar section is shifted telescopically relative to the first curved extender bar section.

2. The extender arm of claim 1 wherein the second curved extender bar section is insertable into the first curved extender bar section.

3. The extender arm of claim 1 wherein the hitch connection section has a length only sufficient to be mounted to a hitch receiver, the remaining sections of the extender arm being curved so that the elevation of the extender arm increases continuously from the hitch receiver.

4. The extender arm of claim 1 wherein the first and second curved extender bar sections each comprise hollow tubes.

5. The extender arm of claim 4 wherein the second curved extender bar section includes a plurality of spaced holes extending through a concave upper side thereof and the first curved extender bar section includes at least one hole in a concave upper side thereof so that the second extender bar section can be pinned relative to the first extender bar section in number of different positions to vary the length of the extender arm.

* * * * *